United States Patent [19]
Coropolis et al.

[11] 3,849,827
[45] Nov. 26, 1974

[54] WINDOW WASHER SEAL ASSEMBLY

[75] Inventors: John P. Coropolis, Newark; James A. Briscoe, Doyleto, both of Del.

[73] Assignee: The B. F. Goodrich Company, New York, N.Y.

[22] Filed: May 21, 1973

[21] Appl. No.: 362,088

[52] U.S. Cl............. 15/250.01, 15/103, 15/250.04, 15/250.1, 15/250.19
[51] Int. Cl. ............................................. B60s 1/46
[58] Field of Search....... 15/250.01, 250.02, 250.03, 15/250.04, 103, 250.19

[56] References Cited
UNITED STATES PATENTS

| | | | |
|---|---|---|---|
| 3,371,368 | 3/1968 | Walker | 15/250.04 |
| 3,431,577 | 3/1969 | Minsky | 15/250.42 |
| 3,548,440 | 12/1970 | Kothari | 15/250.1 |
| 3,548,441 | 12/1970 | Kruger | 15/250.1 X |

*Primary Examiner*—Peter Feldman
*Attorney, Agent, or Firm*—John D. Haney

[57] ABSTRACT

A window washer assembly which also provides a seal for a tailgate window of a station wagon. An inflatable resilient tube mounted on the tailgate carries a pair of blades engageable with the window. A washer fluid is pumped into the tube and ejected through holes between the blades. One of the blades may extend into engagement with the window in the deflated condition of the tube for sealing the space between the tailgate and window and at least one of the blades may be brought into wiping engagement with the window upon inflation of the tube during the washing operation.

11 Claims, 7 Drawing Figures

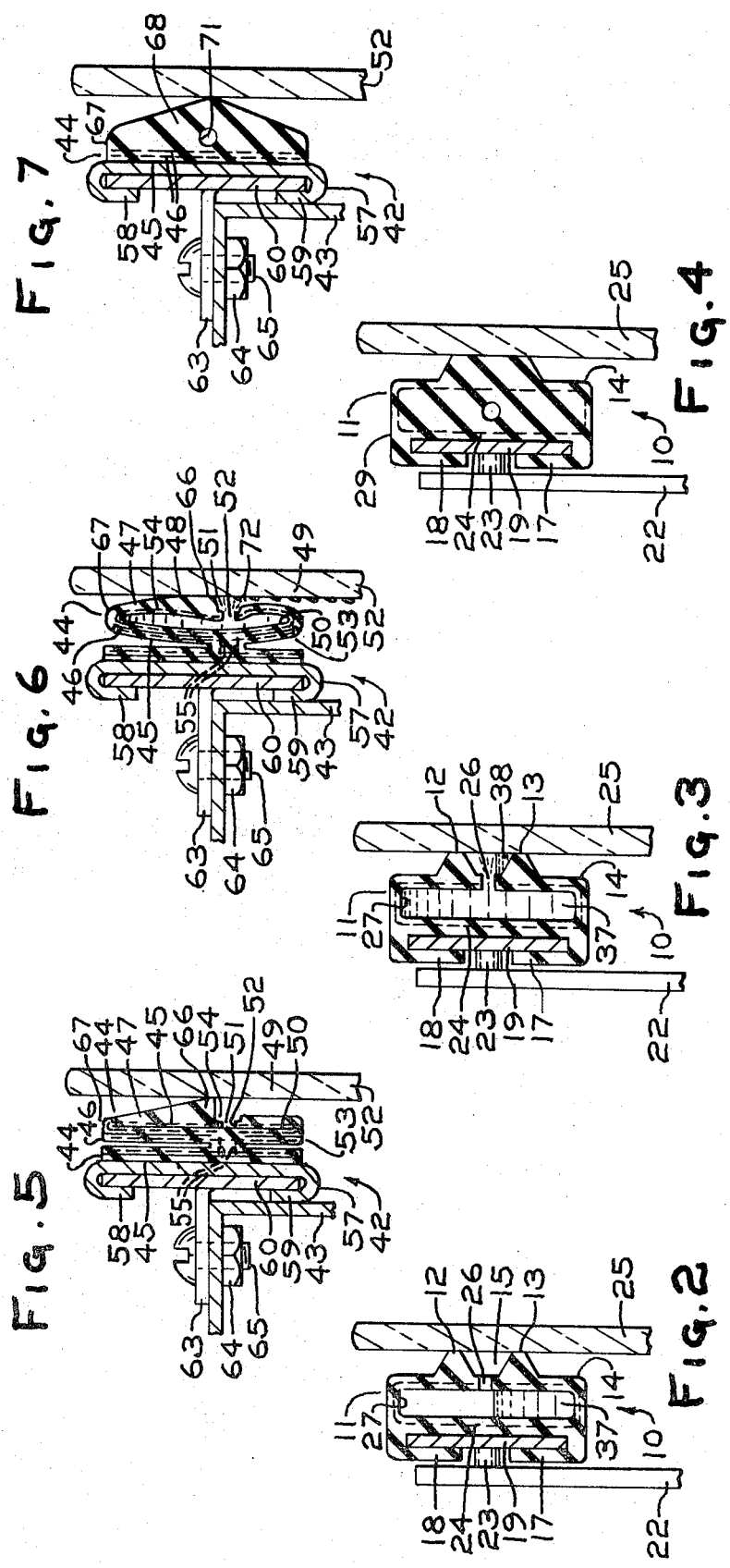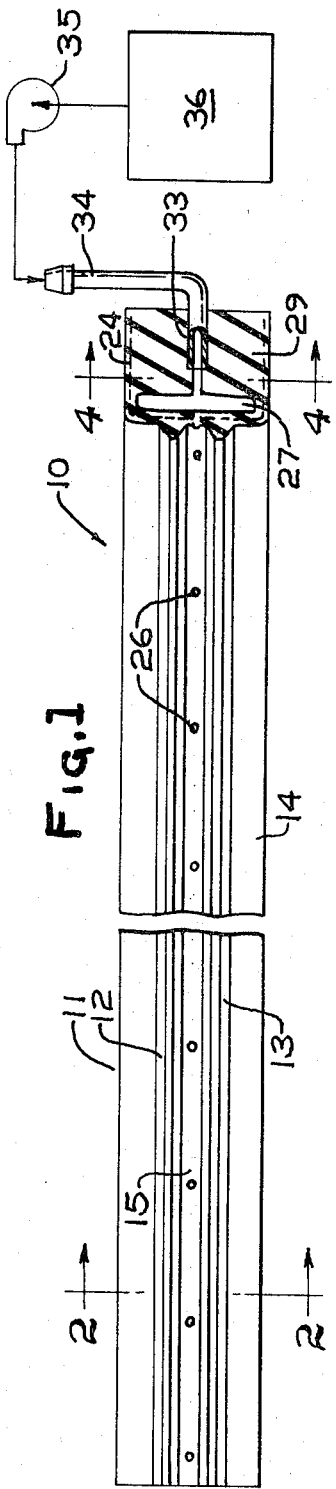

WINDOW WASHER SEAL ASSEMBLY

BACKGROUND OF THE INVENTION

This invention relates to a window washer and seal assembly of the class in which the window is mounted for movement relative to the assembly. Apparatus of this type is particularly useful for cleaning power operated windows and sealing the space between the window and the door in which it is mounted, as, for example, the remotely operated tailgate window of a station wagon.

Prior to this invention, wiper and washer assemblies of this class have consisted of a wiper blade mounted on an expandable tubular body with the blade being projected against the window as a result of the distension of the tubular body when the latter is filled with fluid. This fluid may be a washing liquid which is sprayed on the window through a separate spraying mechanism. In the prior constructions, the wiper blade has been retracted out of engagement with the window when the washing operation is completed requiring a separate sealing member for engagement with the window to close the space between the window and the door.

SUMMARY OF THE INVENTION

The window washer and seal assembly of this invention has a pair of blades with a channel between the blades to retain the washing fluid which is injected into the channel and against the window so that the portion of the window to be washed is completely covered with the washing fluid throughout the length of the window. The retention of the washing fluid in the channel also reduces the quantity of washing fluid required and permits the use of a smaller tank for storing the washing fluid. In addition, at least one of the blades also serves as a seal between the window and the tailgate in the deflated condition of the tubular body.

The accompanying drawings show a preferred form of the window washer seal assembly and a modification built in accordance with and embodying the invention.

BRIEF DESCRIPTION OF THE DRAWINGS

In the drawings:

FIG. 1 is a front elevation of the window-engaging side of the assembly, parts being sectioned to show the construction at one end.

FIG. 2 is a sectional view taken along the plane of line 2—2 of FIG. 1 showing the assembly in the deflated sealing position.

FIG. 3 is a sectional view like FIG. 2 showing the assembly in the inflated condition with the washing fluid injected into the channel between the blades.

FIG. 4 is a sectional view taken along the plane of line 4—4 of FIG. 1 showing the end closure.

FIG. 5 is a sectional, slightly exaggerated, view like FIG. 2 of a modification shown in the deflated condition.

FIG. 6 is a sectional view like FIG. 5 showing the modification in the inflated condition with the washing fluid being injected against the window.

FIG. 7 is a sectional view like FIG. 4 of the modification shown in FIGS. 5 and 6 illustrating the end construction.

DETAILED DESCRIPTION

Referring to FIGS. 1 and 2, a window washer and seal assembly 10 is shown in which a tubular body 11 of flexible resilient material such as rubber molded in the flattened condition extends along the length of the assembly. A pair of blades 12 and 13 on outer wall 14 of the tubular body 11 provide a channel 15 between the blades.

An inner wall 16 of the tubular body 11 has flanges 17 and 18 which are directed inwardly to resiliently grip a thin metal mounting bar 19 which is fastened to an associated frame structure 22 by a series of studs 23. In lieu of the studs 23 and related mounting parts, the inner wall 16 of the tubular body 11 may be simply cemented directly to the frame structure 22 or the mounting bar 19 may be riveted to the frame structure. An internal fabric reinforcement 24 is embedded in the resilient material of the tubular body 11 and serves to control the expansion of the body and movement of the blades 12 and 13 toward an associated window 25. A plurality of openings 26 are spaced one from another in the lengthwise direction of the tubular member body 11 in the outer wall 14 between the blades 12 and 13. Preferably the openings 26 extend on an angular course through the wall 16 so that a fluid medium such as window washing fluid 37 impinges on the window 25 in a direction other than normal and is better distributed over the surface of the glass. The tubular body 11 has an inner chamber 27 extending the length of the body with molded ends 28 and 29 closing the channel 15 and the ends of the chamber 27. A pipe 34 extends into the adjoining end 29 which is preferably stretched over the pipe to form a pressure seal. Ordinarily no cement or gaskets are necessary to form a fluid tight connection. The pipe 34 communicates a source of fluid 37, represented schematically in FIG. 1, by pump 35 and reservoir 36.

The assembly 10 is mounted on the tailgate frame structure 22 in the position shown in FIG. 2 with the ends of the blades 12 and 13 in sealing relationship with the window 25. The resiliency of the tubular body 11 exerts a relatively small force biasing the blades 12 and 13 against the surface of the window 25. This provides a seal but does not interfere with the movement of the window 25 past the blades 12 and 13.

When it is desired to wash the window 25 while it is moved vertically relative to the assembly 10, the pump 35 is started (by suitable equipment not shown) so that the fluid 37 is delivered through pipes 33 and 34 to the chamber 27. As the fluid 37 is displaced into the chamber 27, the tubular body 11 is distended to press the blades 12 and 13 against the window 25, as shown in FIG. 3. Simultaneously, the fluid 37 is sprayed through the openings 26 into the channel 15 and against the window 25. The fluid 37 then accumulates in a pocket 38 above the lower blade 13 which extends across the full length of the channel 15 so that the window is progressively wetted completely across the length of the channel. Then as the window 25 is moved past the blades 12 and 13, the window is washed and wiped clean by one of the blades 12 and 13.

After the window 25 reaches its upward or downward position, the fluid supply system is shut off (which can be done automatically or manually) so that the fluid 37 in the channel 15 drains out between the lower blade 13 and the window 25. The resilience of the tubular body 11 restores it to the flattened position, shown in FIG. 2, removing the pressure of fluid 37 from the blades 12 and 13.

The ends 28 and 29 and the blades 12 and 13 close the channel 15 against the window 25 during the washing operation retaining the fluid in the pocket 38. Because of this construction, the number of openings 26 between the chamber 27 and channel 15 may be reduced because the fluid 37 in the pocket 38 insures that the window 25 is wetted completely across the length of the channel. The amount of fluid 37 pumped into the chamber 27 may also be limited because of the retention of fluid in the pocket 38. The fluid 37 may consist of water or any of the well-known automobile washing liquids.

Referring to FIGS. 5, 6 and 7, a modified form of washer seal assembly 42 is shown mounted on a frame structure 43 of a station wagon tailgate door. A tubular body 44 has an inner wall 45 to which is adhered a fabric tape member 46. An outer wall 47 has a blade 48 extending along the length of the body 44 and engageable with an associated window 49. The tubular body 44 is molded in a flattened condition with an inner chamber 50 substantially closed.

The blade 48 is located adjacent a channel 51 extending the length of the tubular body. A series of spaced-apart openings 52 are provided in the inner wall 45 for communicating a fluid medium such as window washing fluid 53 between the chamber 50 and channel 51.

An internal fabric reinforcement 54 is embedded in the tubular body 44 and extends around the inner chamber 50. The fabric tape member 46 adhered to the inner wall 45 is connected by stitches 55 to a second fabric tape member 56 fastened by a suitable cement to a plate member such as mounting bar 57. The stitches 55 are located at a position spaced from the upper and lower edges of the body 44 so that these edges may be unrestrained during inflation of the body and provide an increased range of movement of the outer wall 47 and blade 48 toward the associated window 49 as shown in FIG. 6.

The mounting bar 57 has inwardly directed flanges 58 and 59 for gripping clips 60 having brackets 63 which may be fastened to the frame structure 43 by nuts 64 and bolts 65. The clips 60 are located at spaced-apart positions along the bar 57 for clamping of the brackets 63 to the frame structure 43.

As shown in FIG. 5, the blade 48 has a bead 66 at the edge of the channel 51 which is in sealing engagement with the surface of the window 49. The outer surface of the blade 48 slopes from the bead 66 to an upper edge 67 of the body 44 in the molded condition of the body. The sloping surface engages the window 49 during downward movement of the window reducing the resistance to movement of the window. Below the blade 48 the lower surface of the blade extends horizontally and substantially perpendicular to the window 49 to provide for improved wiping of the window during upward movement of the window.

As shown in FIG. 7, the ends 68 of the tubular body 44 close the chamber 50 and one of the ends contains an opening 71 which may be resiliently gripped by the pipe 34 and pump 35, as shown in FIG. 1, or by a similar fluid supply means.

As shown in FIG. 6, during the washing operation, fluid 53 is pumped into the chamber 50 of the tubular body 44 distending the body against the surface of the window 49 and causing the blade 48 to press against the window. The fluid 53 is sprayed out of the openings 55 into the channel 51 and against the window 49. A pocket 72 may be formed under the blade 48 and window 49 for directing the fluid 53 outwards and completely wetting the window across the full length of the channel 54. The increased pressure on the blade 48 provides an increased wiping action for more effective washing and wiping of the window 49.

After the window 49 has been moved down and then up past the assembly 42, the pumping of the fluid 53 into chamber 50 is discontinued whereupon the tubular body 44 will return to the flattened shape, shown in FIG. 5. This takes the high pressure off of the blade 48 so that movement of the window 49 past the assembly 42 in the dry condition is not resisted to any great degree. The blade 48 has a substantial thickness in the area exposed to outside forces so as to effectively resist damage to the assembly. This is especially desirable in the present application for the tailgate window of a station wagon where this area is subject to substantial wear and abuse in service.

Other modifications embodying this invention may be used such as a tubular body having a sealing blade and two wiping blades with the fluid injected into the channels between the blades.

We, therefore, particularly point out and distinctly claim as our invention:

1. A window washer and seal assembly comprising a tubular body of flexible, resilient material, a pair of blades extending along one face of said tubular body in spaced-apart relation providing a channel between said blades, mounting means on said tubular body for positioning said body in fixed relation to an associated window, means for communicating a fluid medium into said tubular body for distending said body and thereby biasing at least one of said blades into wiping engagement with said associated window and means for directing the fluid medium into said channel for wetting said associated window and said blades whereby said associated window may be washed and wiped when moved past said blades.

2. A washer and seal assembly according to claim 1 wherein said means for directing fluid medium into said channel includes an opening in said body between said blades leading from inside said tubular body to said channel.

3. A washer and seal assembly according to claim 2 wherein a plurality of openings in said body leading from said channel to the inside of said body are disposed at spaced-apart positions along said body.

4. A washer and seal assembly according to claim 1 wherein said mounting means includes flanges on said tubular body, said flanges being directed inwardly towards each other for resiliently gripping a supporting member for attachment to an associated supporting structure for said associated window.

5. A washer and seal assembly according to claim 1 wherein said tubular body includes a fabric reinforcement in the wall of said body to control the expansion of said body and displacement of said blades during the washing operation.

6. A washer and seal assembly according to claim 1 wherein said tubular body is molded in a flattened condition and with the inner and outer walls of the chamber inside said body spaced apart to provide resilience of said body in the deflated condition for sealing engagement of said blades with said associated window.

7. A washer and seal assembly according to claim 2 wherein end closure means are disposed at the ends of said blades for closing the ends of said channel and retaining the fluid medium during the washing operation.

8. A washer and seal assembly according to claim 1 wherein said blades further comprise an outer blade and an inner blade, said outer blade projecting outwardly from said body a greater distance than said inner blade for sealing engagement of said outer blade with said associated window in the deflated condition of said body and for wiping engagement of said outer blade with said associated window in the distended condition of said body whereby said fluid medium is projected into said channel and against said associated window during the washing and wiping operation.

9. A washer and seal assembly according to claim 8 wherein said outer blade has an outer surface sloping from the edge of said body outwardly to a window-engaging bead at the side of said channel providing a protective sealing rib for said body.

10. A washer and seal assembly according to claim 8 wherein said mounting means includes a plate member attached to the side of said body opposite to the side on which said blades are disposed.

11. A washer and seal assembly according to claim 10 wherein a first fabric tape member is adhered to said plate member, a second fabric tape member is adhered to the wall of said body, said first tape member and said second tape member being stitched together at a position between the edges of said body whereby said edges are unrestrained upon inflation and provide an increased range of movement of said blades toward said associated window.

* * * * *